Oct. 31, 1939.  G. W. SCHATZMAN  2,178,363
FENDER SHIELD CLAMPING MECHANISM
Filed Sept. 18, 1937  2 Sheets-Sheet 1
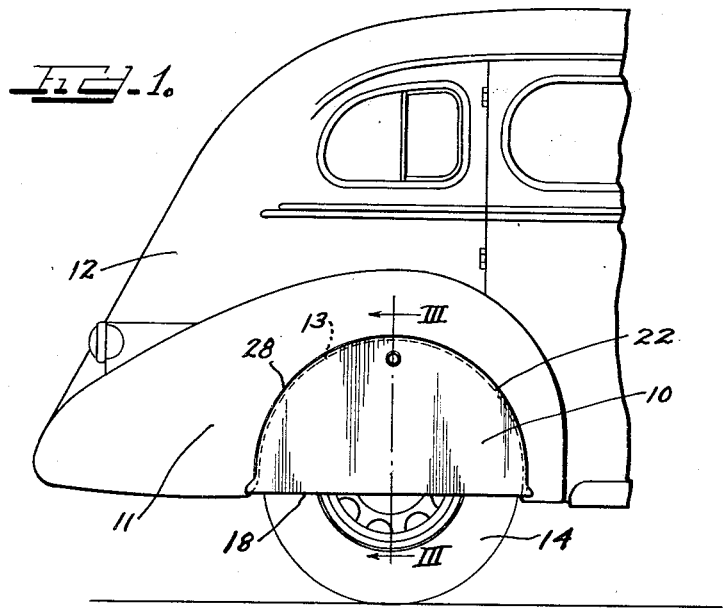
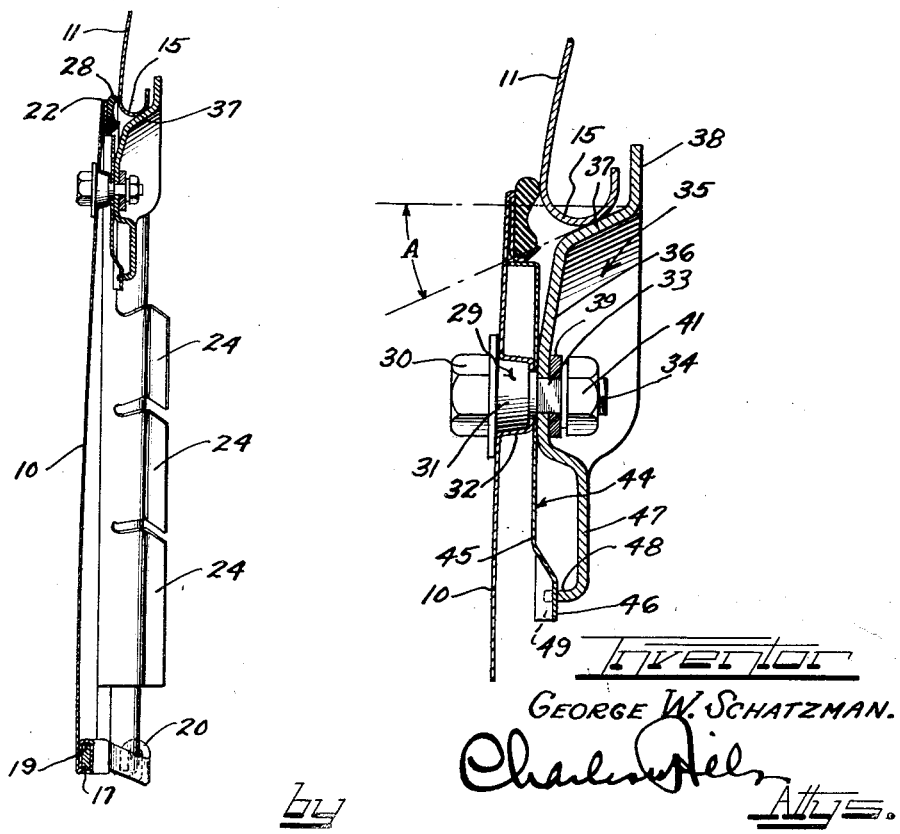
Inventor
GEORGE W. SCHATZMAN.

Oct. 31, 1939.  G. W. SCHATZMAN  2,178,363
FENDER SHIELD CLAMPING MECHANISM
Filed Sept. 18, 1937  2 Sheets-Sheet 2
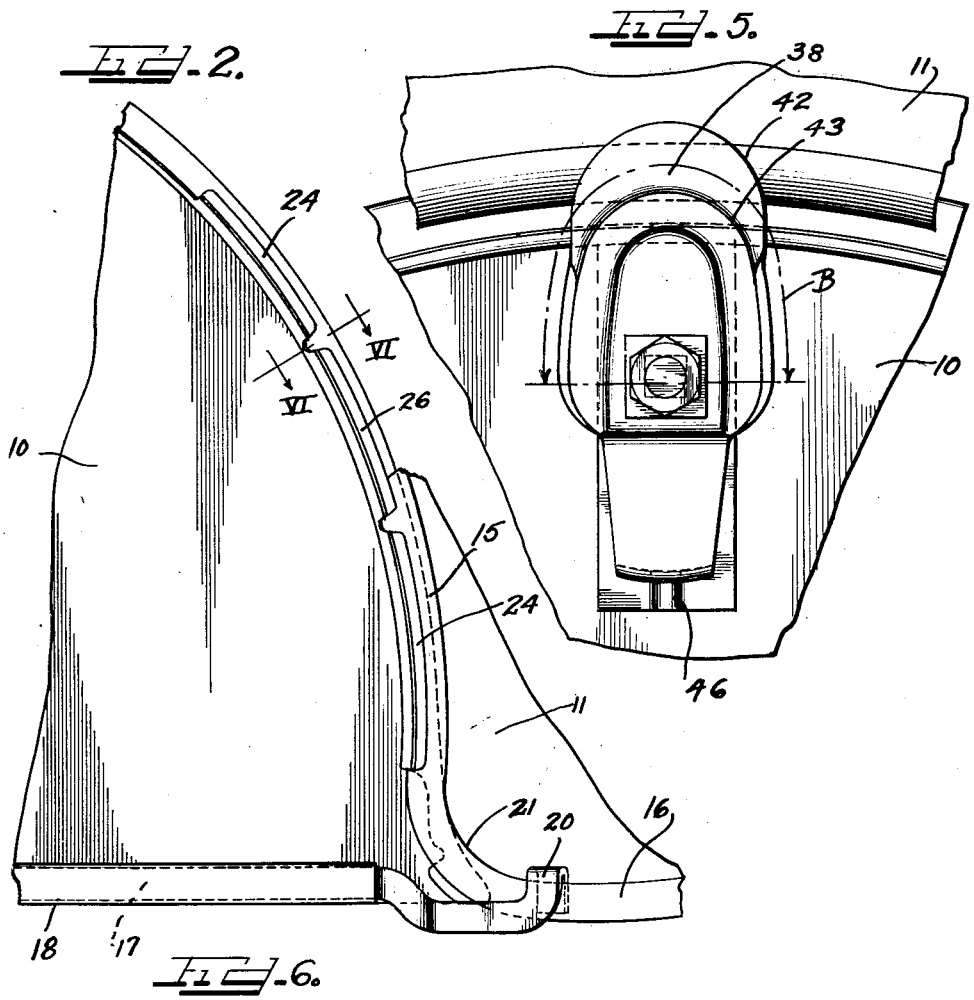
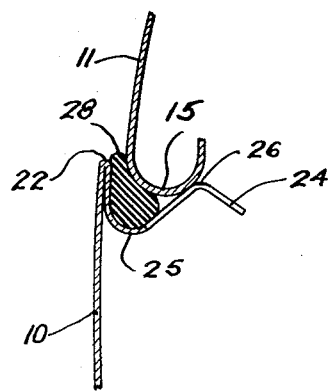
Inventor
GEORGE W. SCHATZMAN.

Patented Oct. 31, 1939

2,178,363

UNITED STATES PATENT OFFICE 2,178,363

FENDER SHIELD CLAMPING MECHANISM

George W. Schatzman, Detroit, Mich., assignor, by mesne assignments, to Houdaille-Hershey Corporation, Detroit, Mich., a corporation of Michigan Application September 18, 1937, Serial No. 164,446

8 Claims. (Cl. 292—204)

This invention relates to ornamental fender skirts, and more particularly to a novel means for securing an ornamental fender skirt to a vehicle fender.

In designing ornamental fender skirts or shields of the type which are adapted to cover the usual wheel access opening in a vehicle fender, it is important that the means which is employed to secure the fender skirt in desired position be simple and quick to operate both in the assembly of the fender skirt on the vehicle fender and in removing it therefrom. It must also possess the desired degree of ruggedness when in use and be substantially free from vibration and noise.

It is an object of this invention to provide a novel ornamental fender skirt and fender skirt clamping mechanism which possesses the above highly desirable characteristics.

It is another object of this invention to provide an improved fender skirt and fender skirt clamping mechanism which is economical to manufacture and which is rugged and reliable in use.

It is a further object of this invention to provide a novel means for retaining the fender engaging edge portion of an ornamental fender skirt in desired position on a vehicle fender.

Another and further object of this invention is to provide novel means for preventing rattling between an ornamental fender skirt and a vehicle fender.

Another and still further object of this invention is to provide a novel clamping mechanism which will apply a downward force on the fender skirt supporting bar and an inward force on the fender engaging edge of the fender skirt.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of the rear part of an automobile having the usual form of vehicle fender and equipped with an ornamental fender skirt constructed in accordance with the teachings of the present invention;

Figure 2 is a rear elevational view of one end of a fender shield, showing the manner in which it engages the underturned edge of a vehicle fender and the manner in which it is supported thereby;

Figure 3 is a cross-sectional, side-elevational view of the fender skirt, taken along the line III—III of Figure 1;

Figure 4 is an enlarged fragmentary view, partly in cross-section of the clamping mechanism;

Figure 5 is a fragmentary rear elevational view of the clamping mechanism; and

Figure 6 is a cross-sectional view of the fender engaging edge of the fender skirt and the underturned opening defining edge of the fender, taken along the line VI—VI of Figure 2.

In Figure 1 of the drawings, I have illustrated a fender skirt 10 constructed in accordance with the teachings of the present invention and assembled on the rear fender 11 of an automobile 12. The fender 11 is formed with the usual opening 13, which affords access to the vehicle wheel 14 and which permits ready removal of the wheel 14 in an axial direction. The ornamental fender skirt 10 is disposed over the opening 13 in such a manner as to substantially close the opening and to harmonize with the outer side wall of the fender 11. The outer surface of the shield 10 may, of course, be substantially smooth, as is illustrated in the drawings, or it may assume any other desired configuration for the purpose of ornamentation.

As shown in Figure 2, the outer marginal edge of the fender 11 which defines the opening 13 is underturned as at 15, while the outer marginal edges that define the base of the fender are underturned as at 16. As is well known to those skilled in the art, fenders of the high crown type are generally provided with these underturned edge portions to increase the rigidity of the fender. As will presently be explained, advantage is taken of this feature to assemble and secure the ornamental fender skirt in the fender opening.

In order to provide a suitable support for the ornamental fender skirt 10, a bar 17 is secured to the base 18 of the skirt in any suitable manner, such as by folding the lower edge of the fender skirt sharply back on itself, then rearwardly and finally downwardly to form a channel portion 19, into which the bar 17 is nested. The bar 17 may be welded or otherwise secured within the channel portion 19, or the metal of the channel portion may simply be crimped tightly around the bar 17, as desired. Although only one end of the fender skirt 10 is illustrated in Figure 2 of the drawings, it is to be understood that the other end of the fender shield is constructed and formed in an identical manner. The bar 17 is so dimensioned as to extend beyond either end of the fender skirt 10 to form trunnion members 20 which are adapted to be supported by the underturned edges 16 of the fender 11. The particular configuration of the trunnion members 20 may, of course, vary through wide limits without departing from the spirit and scope of the present invention, it being only necessary to shape the ends of the bar 17 so that they will extend around the underturned corner 21 of the fender 11 and then downwardly into engagement with the channel formed by the underturned edges 16. As will presently be understood, the trunnion members 20 form a convenient support for the ornamental fender skirt 10, which permits the fender skirt 10 to be wrapped into and out of desired position on the vehicle fender 11. Although the type of material employed in the bar 17 may vary through wide limits without departing from the spirit and scope of the present invention, the bar 17 is preferably formed of a substantially rigid steel bar.

While the trunnion members 20 support the fender skirt 10, it will be observed that it is necessary to provide some means which will substantially hold the curved edge 22 of the skirt 10 firmly against the fender 11. One form of fastening means which has been found highly desirable is to provide a rearwardly extending flange 23 on the skirt 10 in proximity to the curved edge 22 having a plurality of humped resilient fingers or fastening portions 24, such as is illustrated in Figures 2 and 3 of the drawings. The intermediate portion 25 of the flange 23 is preferably shaped to assume approximately the same curvature as that of the underturned edge 15 of the fender 11, while the humped portions 26 of the fingers or portions 24 are arranged to bear against the rear face 27 of the underturned edge 15. It will thus be apparent that as the fender skirt 10 is rocked into desired position about the trunnion member supporting arms 20, the fingers 24 are cammed under the underturned edge 15 of the fender 11. As the humped portions 26 of the fingers 24 pass beneath the lowermost point of the underturned edge 15, the fingers 24 snap up against the rear surface 27 to hold the fender skirt 10 in engagement with the fender 11. As will presently be explained, however, this securing engagement is augmented by a novel clamping mechanism which greatly improves the clamping and latching engagement of the fender skirt on the vehicle fender and which renders the entire assembly more rugged and freer of undesirable vibrations and rattling.

A cushioning ring 28 of rubber or some other suitable material may be disposed in the channel formed by the intermediate portion 25 of the flange 23 to prevent rattling if desired.

In order to hold the trunnion or supporting arms 20 in tight engagement with the underturned edges 16 of the fender 11, and in order to maintain the fender engaging edge 22 tightly against the opening defining edge 13 of the fender 11, a novel clamping and latching mechanism is provided on the fender skirt 10 near the top thereof. This novel clamping and latching mechanism will now be described.

Mounted centrally and at the upper part of the fender skirt 10 is a bolt 29 having a hexagonal head portion 30 disposed on the outer side of the fender skirt 10, a central body portion 31 nested within an upset recess 32 in the fender skirt 10, a latching arm fastening portion 33 having a square cross-sectional configuration, and a threaded tail portion 34. As will readily be seen by an inspection of Figure 4 of the drawings, the bolt 29 is free to rotate in the fender skirt 10, the upset recess 32 acting as a socket in which the rounded intermediate portion 31 of the bolt rotates. Secured to the square portion 33 of the bolt 29 is a latching arm 35. The main body portion 36 of the latching arm 35 is generally channel-shaped in cross-sectional configuration and extends generally upwardly from the bolt 29, as may be seen best in Figure 4. At a point immediately below the underturned edge 15 of the fender 11, the latching arm 35 extends obliquely rearwardly at a substantial angle to both the horizontal and the vertical, as is indicated at 37. The latching arm 35 finally terminates in an upwardly extending lip portion 38.

In order to increase the rigidity of the latching arm 35, a separate piece of metal stock 39 is preferably welded to the rear face of the main body part 36 and a square aperture is provided through both the main body part 36 and the reinforcing strip 39 so as to accommodate the square portion 33 of the bolt 29. A washer 40 and a nut 41 which is internally threaded to accommodate the threaded end 34 of the bolt 29 completes the assembly.

Referring now to Figure 5 of the drawings, it will be observed the the upper lip portion 38 of the latching arm 35 is rounded as at 42, and the obliquely rearwardly extending cam portion 37 is rounded as at 43. The angle A which the obliquely rearwardly extending portion 37 makes with the horizontal in Figure 4 is preferably maintained around the entire distance indicated by the long and short lines lettered B in Figure 5.

From the above description, it will readily be apparent to those skilled in the art that upon rotating the latching arm 35 into an upright position, as shown in Figures 4 and 5 of the drawings, both a downward and an inward force will be applied to the fender skirt 10 at the point where the bolt 29 is mounted by virtue of the angle at which the obliquely rearwardly extending portion 37 engages the underturned edge 15 of the fender 11.

In order to prevent the latching arm 35 from being jarred out of its upright position when the fender skirt 10 is mounted on the vehicle fender 11, some sort of catch or latch means is desirable. As shown in Figures 4 and 5, I have provided a leaf spring 44 which is secured to the rear face of the fender skirt 10 in any suitable manner, and which is provided with a free end 45 having a humped or raised portion 46 therein on its rear face. The latching arm 35 is provided with a tail portion 47 having a forwardly turned end 48 that is slotted as at 49 to fit over the hump or ridge-like portion 46 of the leaf spring 44. Note should be taken that the leaf spring 44 does not rotate with the bolt 29 and the latching arm 35. The hump or ridge-like portion 46 when engaged with the slotted portion 49 of the latching arm 35 normally prevents rotation of the latching arm, such as might be caused by vibrations, jars, or the like. However, upon the application of a sufficient force to the bolt 29, the forwardly turned edge portion 48 of the latching arm 35 may be moved out of engagement with the leaf spring 44.

To assemble an ornamental fender skirt of the type described above, it is simply necessary to insert the fender skirt in the fender opening, causing the trunnion members or supporting arms 20 to engage the underturned marginal edges 16 of the fender 11, and then rock the fender skirt into desired position, the latching arm 35 being so positioned during this operation that it will pass freely beneath the underturned edge 15 of the fender 11. After the fender skirt 10 is in desired position on the fender 11, the latching arm 35 is rotated into the position shown in Figures 4 and 5 of the drawings. As the obliquely rearwardly extending portion 37 of the latching arm 35 rotates into engagement with the underturned edge 15 of the fender 11, it causes a downward and a rearward force to be applied to the fender skirt 10 due to its particular angular position. The fender skirt 10 is now firmly and securely held on the fender 11 by means of this novel latching mechanism.

In order to dismount the fender skirt 10 from the fender 11, the latching arm 35 is rotated approximately 90 degrees out of its upright position. The curved fender engaging edge portion of the fender skirt 10 is pried outwardly by means of any suitable tool, so as to disengage the auxiliary fastening fingers 24 from the underturned edge 15 of the fender 11. The fender skirt 10 may then be quickly and easily removed from the fender 11 by lifting the trunnion or supporting arms 20 out of engagement with the underturned edges 16 of the fender 11.

From the above description, it will be apparent that I have provided an extraordinarily simple fender skirt assembly construction and fender skirt clamping and latching mechanism which is economical to manufacture, and which permits the fender skirt to be firmly and quickly secured in desired position on a vehicle fender.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. With an ornamental fender skirt of the type having a fender engaging edge and which is provided with fender engaging supporting arms at the base thereof for supporting the skirt in latching engagement on a vehicle fender, latching mechanism for holding said skirt in desired position on said fender comprising a latching arm on said skirt remote from said supporting arms which engages said fender and applies a downward and inward force on said skirt, whereby said supporting arms and the fender engaging edge of said skirt are maintained in tight engagement with said fender.

2. With an ornamental fender skirt of the type having a fender engaging edge and which is provided with fender engaging supporting arms at the base thereof for supporting the skirt in latching engagement on a vehicle fender, latching mechanism for holding said skirt in desired position on said fender comprising a rotatable latching arm on the rear face of said skirt remote from said supporting arms which engages said fender and applies a downward and inward force on said skirt, whereby said supporting arms and the fender engaging edge of said skirt are maintained in tight engagement with said fender, means extending through said skirt for rotating said latching arm at will, and means for holding said latching arm in latching position.

3. With an ornamental fender skirt of the type having a fender engaging edge and which is provided with fender engaging supporting arms at the base thereof for supporting the skirt in latching engagement on a vehicle fender, latching mechanism for holding said skirt in desired position on said fender comprising a latching arm rotatably mounted on the rear face of said skirt in proximity to the fender engaging edge thereof and at a point remote from said supporting arms, said latching arm having a latching and cam surface extending obliquely rearwardly and radially outwardly for engagement with the edge of said vehicle fender, said latching and cam surface causing said skirt to be pulled rearwardly at that point and also causing said supporting arms of said skirt to be forced downwardly into tight engagement with said fender.

4. With an ornamental fender skirt of the type having a fender engaging edge and which is provided with fender engaging supporting arms at the base thereof for supporting the skirt in latching engagement on a vehicle fender, latching mechanism for holding said skirt in desired position on said fender comprising a latching arm rotatably mounted on the rear face of said skirt in proximity to the fender engaging edge thereof and at a point remote from said supporting arms, said latching arm having a latching and cam surface extending obliquely rearwardly and radially outwardly for engagement with the edge of said vehicle fender, said latching and cam surface causing said skirt to be pulled rearwardly at that point and also causing said supporting arms of said skirt to be forced downwardly into tight engagement with said fender, and an operating bolt extending through said skirt and secured to said latching arm, said latching arm having a separate reinforcing strip secured thereto in proximity to the point at which said bolt extends through said arm, said bolt having a head thereon on the front side of said skirt whereby said latching arm may be rotated into and out of engagement with said fender.

5. With an ornamental fender skirt of the type having a fender engaging edge and which is provided with fender engaging supporting arms in the base thereof for supporting the skirt in latching engagement on a vehicle fender, latching mechanism for holding said skirt in desired position on said fender comprising a latching arm rotatably mounted on the rear face of said skirt in proximity to the fender engaging edge thereof and at a point remote from said supporting arms, said latching arm having a fender engaging portion extending obliquely rearwardly and at a predetermined angle to the axis of rotation of said latching arm whereby said obliquely rearwardly extending fender engaging portion causes said skirt to be pulled rearwardly at that point and also causing said supporting arms of said skirt to be forced downwardly into tight engagement with said fender when said obliquely rearwardly extending portion engages the wheel opening defining edge of the vehicle fender.

6. With an ornamental fender skirt of the type having a fender engaging edge and which is provided with fender engaging supporting arms at the base thereof for supporting the skirt in latching engagement on a vehicle fender, latching mechanism for holding said skirt in desired position on said fender comprising a latching arm rotatably mounted on the rear face of said skirt in proximity to the fender engaging edge thereof and at a point remote from said supporting arm, said latching arm having a depressed central portion which merges into obliquely outwardly extending wall portions, one of said wall portions forming a latching and cam surface for engagement with the edge of said vehicle fender, said latching and cam surface causing said skirt to be pulled rearwardly at that point and also causing said supporting arms of said skirt to be forced downwardly into tight engagement with said fender.

7. With an ornamental fender skirt of the type having a fender engaging edge and which is provided with fender engaging supporting arms at the base thereof for supporting the skirt in latching engagement on a vehicle fender, latching mechanism for holding said skirt in desired position on said fender comprising a latching arm rotatably mounted on the rear face of said skirt in proximity to the fender engaging edge thereof and at a point remote from said supporting arm, said latching arm having a depressed central portion which merges into obliquely outwardly extending wall portions, one of said wall portions forming a latching and cam surface for engagement with the edge of said vehicle fender, said latching and cam surface causing said skirt to be pulled rearwardly at that point and also causing said supporting arms of said skirt to be forced downwardly into tight engagement with said fender, said latching arm also having a tail portion, and means on said fender skirt for detachably engaging said tail portion to detachably hold said latching arm in its desired latching position.

8. With an ornamental fender skirt of the type having a fender engaging edge and which is provided with fender engaging supporting arms at the base thereof for supporting the skirt in latching engagement on a vehicle fender, latching mechanism for holding said skirt in desired position on said fender comprising a latching arm rotatably mounted on the rear face of said skirt in proximity to the fender engaging edge thereof and at a point remote from said supporting arms, said latching arms having a depressed central portion which merges into obliquely outwardly extending wall portions, one of said wall portions having a substantially U-shape cross-section taken therethrough in a plane perpendicular to the axis of rotation of said latching arms, said U-shape wall portion forming a latching and cam surface for engagement with the edge of said vehicle fender, said latching and cam surface causing said skirt to be pulled rearwardly at that point and also causing said supporting arms of said skirt to be forced downwardly into tight engagement with said fender, said latching arm also having a tail portion with an axially forwardly turned lower edge, said lower edge having a notch therein, and a spring finger on said fender skirt arranged to be snapped into the notched portion of said lower edge of said tail portion of said latching arm when said latching arm is moved into latching position.

GEORGE W. SCHATZMAN.